United States Patent Office 3,514,162
Patented May 26, 1970

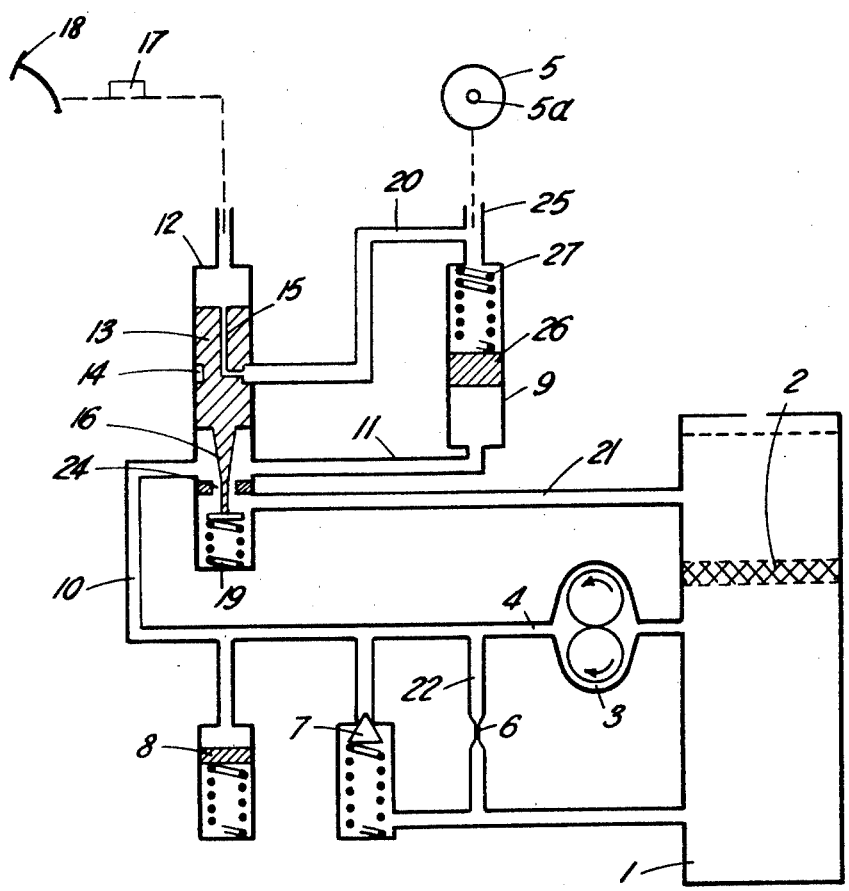

3,514,162
BRAKING APPARATUS
Vivien Woodland Erlebach and Richard Frank Gandy, London, England, assignors to Simms Group Research & Development Limited, London, England, a British company
Filed Oct. 4, 1968, Ser. No. 765,192
Claims priority, application Great Britain, Oct. 10, 1967, 46,183/67
Int. Cl. B60t 8/06
U.S. Cl. 303—21
3 Claims

ABSTRACT OF THE DISCLOSURE

A vehicle brake pedal pumps fluid to operate a slidable shuttle valve to control fluid pressure supplied to the brake from a pump driven by rotation of the vehicle wheel. A passage is provided through the shuttle valve so that fluid pumped by the brake pedal can pass through this passage to operate the brake. If the brake pedal is pushed further the fluid moves the shuttle valve against a biass to cut off the passage from the pedal to the vehicle wheel brake and to allow pressure from the pump to operate the brake.

---

The invention relates to braking apparatus.

The invention provides braking apparatus for providing fluid pressure to operate a vehicle wheel brake, which apparatus includes a power operated pump driven in dependence upon the speed of rotation of the vehicle wheel and arranged to pump fluid along a first conduit for operating the brake, a second fluid pumping device movable by a brake actuating member to develop a pressure dependent on the extent of movement of the brake actuating member, a second fluid conduit for delivering fluid from said second fluid pressure generating means for operating the brake, a pressure control valve device arranged to control the pressure fed from said pump through the first conduit to operate the brake in dependence on the extent of movement of the brake actuating member, biassing means tending to move the pressure control valve device to a position preventing pressure from said pump operating the brake and means responsive to pressure in the second conduit for moving said pressure control valve device against the biassing means whereby, on initiating braking action, fluid initially passes through the second conduit to operate the brake and subsequently the valve device may move to allow fluid pressure from the pump to operate the brake.

Preferably the said second fluid pumping device is manually driven and includes a pump member connected to a brake pedal so as to be moved by depression of the pedal.

Preferably the control valve device is mounted on a piston slidable within a cylinder, the cylinder being connected to the said second fluid conduit so that the piston may be moved in dependence on the fluid pressure in the second fluid conduit.

Preferably the valve device comprises a tapered valve member mounted on one end of the piston and arranged to move through an orifice to vary the restriction of the orifice.

Preferably a by-pass conduit is provided and said orifice is arranged to connect said first conduit to the by-pass conduit when the said orifice is open, whereby pressure is prevented from building up in the first conduit.

Preferably the second conduit includes a bore passing through part of the piston communicating with an annular groove in the peripheral surface of the piston, and a further conduit connected to the vehicle wheel brake is connected to the cylinder in which the piston slides so that over a limited range of movement of the piston, said further conduit communicates with the said annular groove.

An embodiment of the invention will now be described by way of example and with reference to the accompanying drawing which shows apparatus for operating a vehicle wheel brake.

In this example a vehicle wheel 5 has a brake 5a which is operated by depressing a foot pedal 18. When the foot brake is depressed only a little, the brake is applied gently by a direct hydraulic link through a conduit 20 from the foot pedal. If the pedal 18 is depressed further the brake is operated by pressure generated by a power operated pump 3 driven by the vehicle wheel which provides an anti-skid device to prevent the wheel locking. A tank 1 containing a brake fluid has disposed therein a transversely extending filter 2. A gear pump 3 which may alternatively be a transfer or piston pump is connected to the tank 1 for pumping fluid under pressure through a conduit 4. The pump 3 is connected for rotation in dependance upon the rotation of the wheel 5 of a vehicle so that the rate of pumping is dependent upon speed of wheel rotation. Upon lock condition taking place in wheel 5 the fluid pressure generated by pump 3 in conduit 4 tends to become less and less. A leak orifice 6 is provided in a conduit 22 connecting the conduit 4 back to the tank 1. A pressure relief valve is provided at 7. An hydraulic accumulator device is indicated at 8 to even out fluid pressure pulsations in the conduit 4. A conduit 10 connects the conduit 4 to the inlet of a transverse conduit 12. A slidable plug 13 fits closely within the conduit 12 and carries at its lower end a tapered member 16 which passes through an orifice 24 in the conduit 12. A spring 19 biasses the plug 13 upwardly so that a clear passage exists through the orifice 24. Two outlets are provided from the conduit 12, one just above the orifice 24 and one just below the orifice 24. The upper outlet is connected by a conduit 11 to a further transverse conduit 9 containing a slidable plug 26. The lower outlet is connected by a conduit 21 back to the tank 1 above the filter 2. The plug 26 is urged downwardly by a spring 27 against a stop (not shown). The upper part 25 of the conduit 9 is connected to the vehicle brake 5a and provides a fluid passageway to the brake 5a. A conduit 20 connects a further outlet from the conduit 12 with the upper part 25 of the conduit 9. The plug 13 has an annular groove 14 around its circumference which in the position shown in the drawing connects with the conduit 20. A bore 15 through the plug 13 connects the part of the conduit 12 above the plug 13 to the annular groove 14. The brake pedal 18 is connected to a brake fluid master cylinder 17 and includes a fluid displacement member connected to the pedal 18 so that fluid pressure is generated in the cylinder 17 to an extent dependent on how far the pedal 18 is depressed. The outlet of the cylinder 17 is connected to the conduit 12 above the plug 13.

In the position shown in the drawing, the gear pump 3 pumps hydraulic brake fluid from the reservoir tank 1 through conduits 4 and 10, the adjustable orifice 24, the return conduit 21, and back into the reservoir tank 1. In this way, pressure is not allowed to build up in the conduit 11 and the brake is not applied by the powered system.

When the adjustable orifice 24 is restricted by depression of the pedal 18, pressures does build up in conduits 10 and 11 and in the bottom part of conduit 9.

The fluid in conduit 25 is separated from the fluid pumped by the gear tooth pump 3 by the plug 26.

However the pressure in the bottom of conduit 9 is transmitted to fluid in conduit 25, thereby to operate the brake 5a, by means of the plug 26 rising.

When the foot pedal 18 is depressed the fluid pressure in the top of the cylinder 12 is raised. Initially pressure is transmitted through the bore 15, annular groove 14 into conduit 20 and applies the brakes gently. The piston 26 is at this time biased by the spring 27 against a stop, so that pressure generated by movement of the foot brake pedal 18 and transmitted to conduit 20 applies the vehicle wheel brake and cannot move the piston 26. If however the foot pedal is depressed further the piston 13 is forced downwards against the spring 19. This has two effects. It cuts off the annular groove 14 from communicating with conduit 20, and forces a tapered member 16 projecting from the bottom of piston 13 into the orifice 24. This restricts the flow of fluid through the orifice 24 and causes the vehicle wheel brake to be applied by the pressure built up by the pump 3 in the conduit 9. If the foot pedal is depressed to its maximum, the orifice 24 is completely shut off and a maximum pressure builds up at the bottom of cylinder 9 dependent on the size of the restriction 6 and the speed of the pump 3. Thus, since the pump 3 is driven by the vehicle wheel 5 the pressure will depend on the speed of rotation of the wheel 5. Should the wheel 5 lock, the pump 3 will stop and the pressure operating the brake drop, thus releasing the pressure on the brake and allowing the wheel 5 to rotate again.

The invention is not restricted to the details of the foregoing example. The extent of movement of brake pedal 18 for which braking effort is applied to the wheel 5 can be made variable and it can be arranged that plug member 13 has motion imparted thereto on initial depression of brake pedal 18. Alternatively a variable degree of lost motion may be incorporated by arranging the annular groove 14 to be above the junction with conduit 20 when the foot pedal is not depressed so that the initial depression of the foot pedal moves the piston 13 down until the annular groove 14 cooperates with the conduit 20.

Further, the taper of the restricting orifice part 16 may be varied along its extent for variation in the application of fluid pressure to the wheel when the wheel tends to lock.

It will be appreciated that the arrangement as hereinbefore described enables an initial braking effort to be applied to the wheel and that such braking effort can be made to be of varying degree.

We claim:

1. Braking apparatus for providing fluid pressure to operate a vehicle wheel brake, which apparatus includes a power operated pump driven in dependence upon the speed of rotation of the vehicle wheel and arranged to pump fluid along a first conduit for operating the brake, a second fluid pumping device movable by a brake actuating member to develop a pressure dependent on the extent of movement of the brake actuating member, a second fluid conduit for delivering fluid from said second fluid pressure generating means for operating the brake, a pressure control valve device arranged to control the pressure fed from the said pump through the first conduit to operate the brake in dependence on the extent of movement of the brake actuating member, biasing means tending to move the pressure control valve device to a position preventing pressure from said pumps operating the brake and means responsive to pressure in the second conduit for moving said pressure control valve device against the biasing means whereby, on initiating braking action, fluid initially passes through the second conduit to operate the brake and subsequently the valve device may move to allow fluid pressure from the pump to operate the brake, said second fluid pumping device being manually driven and including a pump member connected to a brake pedal so as to be moved by depression of the pedal, a cylinder, a piston slidable therein, the control valve device being mounted on said piston, the cylinder being connected to the said second fluid conduit so that the piston may be moved in dependence on the fluid pressure in the second fluid conduit, said valve device comprising a tapered valve member mounted on one end of the piston and arranged to move through an orifice to vary the restriction of the orifice, said second conduit including a bore passing through part of the piston communicating with an annular groove in the peripheral surface of the piston, and, a further conduit connected to the vehicle wheel brake being connected to the cylinder, said further conduit communicating with the said annular groove, over a limited range of the sliding movement of said piston in the cylinder, a further piston and cylinder device being provided between the vehicle wheel brake and the first conduit so that the fluid in the first conduit is isolated from that in the second conduit.

2. Braking apparatus as claimed in claim 1 in which a hydraulic accumulator device is provided for reducing fluctuation of pressure in the first conduit.

3. Braking apparatus as claimed in claim 2 in which the pump is connected to a reservoir of brake fluid and a pressure relief valve is provided in a conduit connecting the said first conduit to the reservoir in parallel with the pump.

References Cited

UNITED STATES PATENTS

| | | | |
|---|---|---|---|
| 2,480,651 | 8/1949 | Hawkins et al. | 303—10 X |
| 3,014,764 | 12/1961 | Heckendorf | 303—21 |
| 3,032,995 | 5/1962 | Knowles | 303—10 X |
| 3,124,220 | 3/1964 | Kell | 303—21 X |
| 3,388,951 | 6/1968 | Marcellus | 303—21 |

MILTON BUCHLER, Primary Examiner

J. J. McLAUGHLIN, Jr., Assistant Examiner

U.S. Cl. X.R.

188—181; 303—10, 61